United States Patent
Ghosh

(10) Patent No.: US 8,479,171 B2
(45) Date of Patent: Jul. 2, 2013

(54) GENERATING TEST SETS USING INTELLIGENT VARIABLE SELECTION AND TEST SET COMPACTION

(75) Inventor: Indradeep Ghosh, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 208 days.

(21) Appl. No.: 12/785,756

(22) Filed: May 24, 2010

(65) Prior Publication Data

US 2011/0289488 A1 Nov. 24, 2011

(51) Int. Cl.
*G06F 9/44* (2006.01)
(52) U.S. Cl.
USPC .......................... 717/131; 717/124; 717/130
(58) Field of Classification Search
None
See application file for complete search history.

(56) References Cited

U.S. PATENT DOCUMENTS

| | | | |
|---|---|---|---|
| 5,317,740 A * | 5/1994 | Sites | 717/131 |
| 6,675,382 B1 | 1/2004 | Foster | 717/177 |
| 6,938,186 B2 | 8/2005 | Das | |
| 7,168,009 B2 | 1/2007 | Darringer et al. | 714/38 |
| 7,584,455 B2 | 9/2009 | Ball | 717/124 |
| 7,661,097 B2 | 2/2010 | Mukkavilli | 717/143 |
| 7,681,180 B2 | 3/2010 | de Halleux et al. | 717/124 |
| 7,844,951 B2 | 11/2010 | Chen et al. | 717/124 |
| 7,861,226 B1 * | 12/2010 | Episkopos et al. | 717/131 |
| 7,873,945 B2 | 1/2011 | Musuvathi et al. | 717/124 |
| 7,886,272 B1 * | 2/2011 | Episkopos et al. | 717/131 |
| 7,926,039 B2 * | 4/2011 | Wang et al. | 717/126 |
| 7,945,898 B1 * | 5/2011 | Episkopos et al. | 717/131 |
| 8,185,881 B2 | 5/2012 | Brand et al. | 717/132 |
| 8,271,953 B2 | 9/2012 | Prasad et al. | 717/126 |
| 8,286,140 B2 * | 10/2012 | Sadowsky | 717/124 |
| 8,302,080 B2 | 10/2012 | Wassermann et al. | 717/131 |
| 2003/0226060 A1 | 12/2003 | Das | |
| 2005/0066234 A1 | 3/2005 | Darringer et al. | 714/38 |
| 2005/0262456 A1 * | 11/2005 | Prasad | 716/4 |
| 2006/0247907 A1 | 11/2006 | Qadeer et al. | 703/22 |
| 2006/0253739 A1 | 11/2006 | Godefroid et al. | 714/38 |
| 2007/0033576 A1 * | 2/2007 | Tillmann et al. | 717/124 |
| 2007/0168988 A1 | 7/2007 | Eisner et al. | 717/126 |
| 2008/0082968 A1 * | 4/2008 | Chang et al. | 717/124 |
| 2009/0089759 A1 | 4/2009 | Rajan et al. | 717/126 |

(Continued)

OTHER PUBLICATIONS

Li et al., "KLOVER: A Symbolic Execution and Automatic Test Generation Tool for C++ Programs", 23rd International Conference on Computer Aided Verification CAV 2011, Jul. 14-20, 2011, pp. 1-6 <http://www.cs.utah.edu/~ligd/publications/KLOVER-CAV11.pdf>.*

(Continued)

*Primary Examiner* — Thuy Dao
*Assistant Examiner* — Ben C Wang
(74) *Attorney, Agent, or Firm* — Baker Botts L.L.P.

(57) ABSTRACT

In one embodiment, constructing one or more sets of variables corresponding to one or more input variables of a software module respectively; for each one of the sets of variables, computing an average branching depth that is affected by the set of variables; selecting a first one of the sets of variables that has the smallest average branching depth; assigning a first symbolic value to the input variable of the first set of variables; symbolically executing the software module to generate a first set of test cases for the first set of variables; optionally compacting the first set of test cases by removing the redundant tests that do not increase test coverage and selecting a minimal subset of the first set of test cases that cover all the covered conditional branch points; and validating the software module using the first set of test cases.

29 Claims, 5 Drawing Sheets

U.S. PATENT DOCUMENTS

| | | | |
|---|---|---|---|
| 2009/0125976 A1 | 5/2009 | Wassermann et al. | 726/1 |
| 2009/0228871 A1 | 9/2009 | Edwards | |
| 2009/0235235 A1* | 9/2009 | Prasad et al. | 717/126 |
| 2009/0265692 A1 | 10/2009 | Godefroid | |
| 2010/0005454 A1* | 1/2010 | Sankaranarayanan et al. | 717/127 |
| 2010/0083233 A1* | 4/2010 | Vanoverberghe et al. | 717/126 |
| 2010/0125832 A1 | 5/2010 | Prasad et al. | 717/124 |
| 2010/0223599 A1* | 9/2010 | Ghosh et al. | 717/130 |
| 2010/0242029 A1* | 9/2010 | Tkachuk et al. | 717/135 |
| 2010/0281460 A1* | 11/2010 | Tillmann et al. | 717/131 |
| 2010/0287534 A1* | 11/2010 | Vangala et al. | 717/130 |
| 2010/0313187 A1 | 12/2010 | Tan et al. | 717/131 |
| 2011/0016456 A1* | 1/2011 | Artzi et al. | 717/131 |
| 2011/0072417 A1* | 3/2011 | Dhurjati et al. | 717/124 |
| 2011/0283147 A1* | 11/2011 | Prasad et al. | 714/38.1 |
| 2012/0017119 A1* | 1/2012 | Ghosh et al. | 714/38.1 |
| 2012/0017200 A1* | 1/2012 | Ghosh et al. | 717/126 |
| 2012/0084609 A1* | 4/2012 | Tkachuk et al. | 714/48 |
| 2012/0110580 A1* | 5/2012 | Ghosh et al. | 718/100 |
| 2012/0110589 A1* | 5/2012 | Ghosh et al. | 718/104 |
| 2012/0110590 A1* | 5/2012 | Ghosh et al. | 718/104 |
| 2012/0110591 A1* | 5/2012 | Ghosh et al. | 718/104 |
| 2012/0192150 A1* | 7/2012 | Li et al. | 717/118 |
| 2012/0192162 A1* | 7/2012 | Li et al. | 717/141 |
| 2012/0192169 A1* | 7/2012 | Li et al. | 717/161 |
| 2012/0204154 A1* | 8/2012 | Li et al. | 717/124 |
| 2012/0311545 A1* | 12/2012 | Li et al. | 717/132 |

OTHER PUBLICATIONS

Li et al., "Context-Sensitive Relevancy Analysis for Efficient Symbolic Execution", APLAS 2008 LNCS 5356, 2008, Springer-Verlag, pp. 36-52 <http://users.ece.utexas.edu/~khurshid/papers/2008/08aplas-rel-symbolic.pdf>.*

Lin et al., "Using Genetic Algorithms for Test Case Generation in Path Testing", 2000 IEEE, pp. 241-246; <http://ieeexplore.ieee.org/stamp/stamp.jsp?tp=&arnumber=893632>.*

Stefan Bucur, "Scalable Automated Testing Using Symbolic Execution", DSLAB, I&C, EPEL, May 5, 2009, pp. 1-8; <http://wiki.epfl.ch/edicpublic/documents/Candidacy%20exam/bucur_proposal.pdf>.*

Patil et al., "A Parallel Branch and Bound Algorithm for Test Generation", 1989 ACM, pp. 339-344; <http://dl.acm.org/citation.cfm?id=74382.74439>.*

Majumdar et al., "Directed Test Generation using Symbolic Grammars", 2007 ACM, ESEC/FSE'07, Sep. 3, 2007, Croatia, pp. 553-556; <http://dl.acm.org/citation.cfm?id=1295039>.*

Ratsaby et al., "Improvements in Coverability Analysis", Springer-Verlag Berlin Heidelberg 2002, FME 2002, LNCS 2391, pp. 41-56; <http://link.springer.com/chapter/10.1007%2F3-540-45614-7_3>.*

Khor et al., "Using a Genetic Algorithm and Formal Concept Analysis to Generate Branch Coverage Test Data Automatically", 2004 IEEE, ASE'04, pp. 1-4; <http://ieeexplore.ieee.org/stamp/stamp.jsp?tp=&arnumber=1342761>.*

Person et al., "Directed Incremental Symbolic Execution", 2011 ACM, PLDI'11, Jun. 4-8, 2011, San Jose, California, USA, pp. 1-12; <http://dl.acm.org/results.cfm?h=1&cfid=182245922&cftoken=20250231>.*

Shannon et al., "Efficient Symbolic Execution of Strings for Validating Web Applications", 2009 ACM, DEFECTS'09, Jul. 19, 2009, Chicago, Illinois, USA, pp. 22-26; <http://dl.acm.org/citation.cfm?id=1555868>.*

Patrice Godefroid, "Test Generation Using Symbolic Execution", 2012, Microsoft Research; pp. 1-10; <http://research.microsoft.com/en-us/um/people/pg/public_psfiles/fsttcs2012.pdf>.*

Baar et al., "Symbolic Search-Based Testing", 2011 IEEE, ASE 2011, Lawrence, KS, USA, pp. 53-62; <http://ieeexplore.ieee.org/stamp/stamp.jsp?tp=&arnumber=6100119>.*

Anand et al., "Type-dependence Analysis and Program Transformation for Symbolic Execution," *TACAS, Lecture Notes in Computer Science*, vol. 4424, pp. 117-133, 2007.

Khurshid et al., "Generalizing Symbolic Execution to Library Classes, " *ACM Sigsoft Software Engineering Notes*, vol. 31(1); pp. 103-110, 2005.

Office Action for U.S. Appl. No. 12/407,695, Jun. 22, 2012.

Tkachuk, Oksana et al., "Combining Environment Generation and Slicing for Modular Software Model Checking", *ASE'07*, Nov. 5-9, 2007, pp. 401-404, 2007.

Corbett, James C., et al., "*Bandera: Extracting Finite-state Models from Java Source Code*", Proceedings of the 22nd International Conference on Software Engineering (ICSE '00, ACM, pp. 439-448, 2000.

Lhoták, Jennifer, et al., "*Integrating the Soot compiler infrastructure into an IDE*", McGill University School of Computer Science, Sable Research Group, Sable Technical Report No. 2003-4, 15 pages, Oct. 16, 2003.

Li, X., et al., "*Interprocedural Program Analysis for Java based on Weighted Pushdown Model Checking*", The 5th International Workshop on Automated Verification of Infinite-State Systems (AVIS 2006), ETAPS, pp. 1-13, Apr. 2006.

Li, X., "*Static Program Analysis for Software Validation*", Japan Advanced Institute of Science and Technology, 21st Century COE Symposium 2008, Verifiable and Evolvable e-Society, 5 pages, Mar. 4, 2008.

USPTO Nonfinal Office Action for U.S. Appl. No. 12/395,515, Aug. 16, 2012.

Response to Nonfinal Office Action for U.S. Appl. No. 12/407,695, Sep. 20, 2012.

USPTO, Nonfinal Office Action for U.S. Appl. No. 12/407,695, filed by Oksana Tkachuk, Jan. 15, 2013.

Oksana Tkachuk et al., Response to Nonfinal Office Action for U.S. Appl. No. 12/407,695, Mar. 20, 2013.

Jovanovic, Nenad, et al., "*Pixy: A Static Analysis Tool for Detecting Web Application vulnerabilities (Short Paper)*", Proceedings of the 2006 IEEE Symposium on Security and Privacy (S&P'06), IEEE Computer Society, 6 pages, 2006.

Saxena, Prateek, et al., "*A Symbolic Execution Framework for JavaScript*", 2010 IEEE Symposium on Security and Privacy, IEEE Computer Society, pp. 513-528, 2010.

Alkhalaf, Muath, et al., "*Viewpoints: Differential String Analysis for Discovering Client-and Server-Side Input Validation Inconsistencies*", ISSTA, Minneapolis, MN, 11 pages, Jul. 15-20, 2012.

USPTO, Notice or Allowance and Fees Due for U.S. Appl. No. 12/407,695, filed Mar. 19, 2009 by Oksana Tkachuk, 14 pages, Apr. 10, 2013.

* cited by examiner

GENERATING TEST SETS USING INTELLIGENT VARIABLE SELECTION AND TEST SET COMPACTION

TECHNICAL FIELD

This disclosure generally relates to testing and validating software modules.

BACKGROUND

A software application may include any number of modules, and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the test cases. In the later case, a software testing tool, implemented as computer software or hardware, may automatically generate test cases for a software module under test, execute the module under test while simulating the test cases, and check for module behavior or output that does not agree with the test cases.

DESCRIPTION OF EXAMPLE EMBODIMENTS

Figure 1:
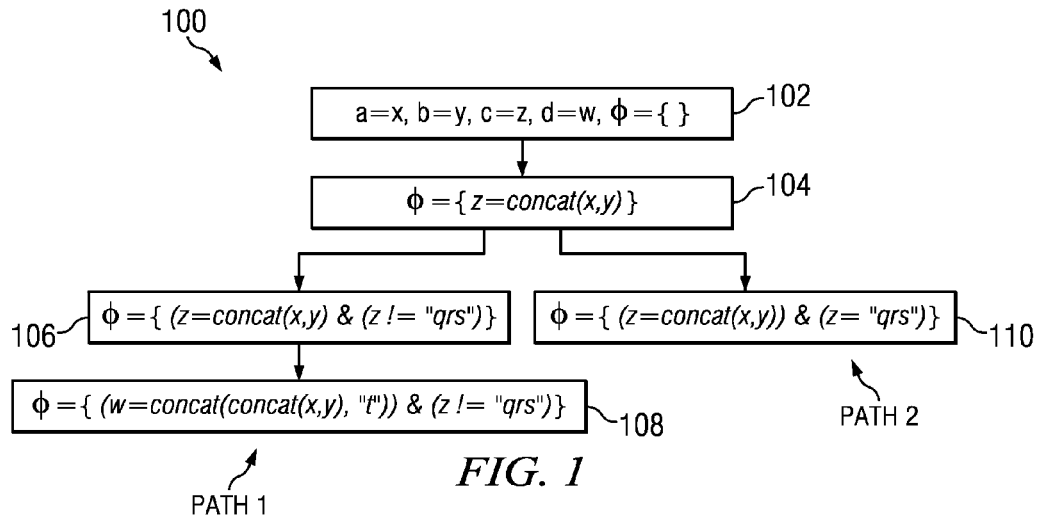
FIG. 1 illustrates an example execution flow representing the steps of performing symbolic execution on an example software module.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

To test or validate a software module, typically, test cases are generated for the module based on, for example, the design specification or other types of requirements (e.g., functional, behavioral, or performance requirements) of the module. Thereafter, the software module is executed under the test cases and the module's behavior or output is validated against the test cases. In particular embodiments, a test case may include a set of input values and information describing the specific test to be performed on the software module in connection with the input values. In particular embodiments, the input values may be assigned to the input variables of the software module when the module is being tested. Each input value may be selected to cause the module to respond in some specific manner (e.g., providing a specific output value). The test information may describe what specific features of the software module are tested, how and under what circumstance the input values are to be applied to the input variables of the software module, what is the correct behavior or output value the software module should provide in response to the input values, and so on.

Test cases may be generated for a software module either manually (e.g., by humans) or automatically (e.g., by a test-case generating tool implemented as computer hardware or software). Often, manually generated test cases have relatively poor coverage on different portions of the source code of the software module under test, and the actual process of manually generating the test cases is time consuming and costing. On the other hand, automatically generated test cases provide better test coverage and requires less time and human effort.

In particular embodiments, the input values of the test cases may be obtained by performing symbolic execution on the software module under test. However, this method may have some drawbacks. Since symbolic execution is very expensive in terms of CPU time and other types of computer resources, it is typically performed on the software module by making only one input variable of the software module symbolic at a time. If a software module has more than one input variables, then symbolic execution needs to be performed on the software module multiple times. Furthermore, depending on which one of the input variables is symbolically executed first and which one is symbolically executed second, the input values obtained from symbolic execution may differ and may provide different test coverage. Second, if a software module has a relatively large number of input variables, the number of input variables obtained from symbolic execution, and thus the number of test cases generated, may be very large, resulting in a test-case explosion, which may lead to large regression testing times when the test cases are integrated into, for example, test suits.

To overcome these drawbacks, when performing symbolic execution on a software module that has multiple input variables, particular embodiments may intelligently determine the order for symbolically executing the input variables based on the branching depths the input variables affect. In addition, once the test cases are generated as a result of symbolic execution, particular embodiments may eliminate those test cases that provide duplicate or superfluous test coverage to reduce the number of test cases eventually used to test the software module.

In the field of computer science, symbolic execution refers to the analysis of software programs by tracking symbolic rather than actual values, as a case of abstract interpretation. It is a non-explicit state model-checking technique that treats input to software modules as symbol variables. It creates complex mathematical equations or expressions by executing all finite paths in a software module with symbolic variables and then solves the complex equations with a solver (typically known as a decision procedure) to obtain error scenarios, if any. In contrast to explicit state model checking, symbolic execution is able to work out all possible input values and all possible use cases of all input variables in the software module under analysis.

To further explain symbolic execution, consider an example software module named "foo":

```
1      foo (a, b) {
2          string a, b, c, d;
3          c = a.concat (b) ;
4          if ! (c.equals ("qrs")) {
5              d = c.concat ("t") ;
6              return d;
7          } else {
8              return c;
9          }
10     }
```

SAMPLE CODE 1

Software module "foo" has two input variables "a" and "b" and two intermediate variables "c" and "d". In particular embodiments, an intermediate variable of a software module is a variable local to the software module and exists only in the context of the software module. It may also be referred to as a local variable because it only has a local scope and is accessible only from within the software module in which it is declared. The value of an intermediate variable may depend, directly or indirectly, on the value of one or more input variables of the software module. For example, with module "foo", the value of intermediate variable "c" depends directly on the values of input variables "a" and "b", as indicated by line 3 of the code; and the value of intermediate variable "d" depends indirectly on the values of input variables "a" and "b", through intermediate variable "c", as indicated by line 5 of the code. In addition, module "foo" contains a conditional branching point at line 4 of the code, caused by the "if-else" statement. The conditional branching point at line 4 is associated with a branching condition "!(c.equals ("qrs"))". Depending on whether this branching condition is satisfied or holds true—that is, whether intermediate variable "c" equals "qrs"—module "foo" proceeds down different execution paths and different portions of the code of module "foo" is actually executed. More specifically, if intermediate variable "c" does not equal "qrs", then the value of intermediate variable "d" is computed and returned, as indicated by lines 5 and 6 of the code. On the other hand, if intermediate variable "c" does equal "qrs", then the value of intermediate variable "c" is returned, as indicated by line 8 of the code.

When symbolic execution is performed on module "foo", its input and intermediate variables are each assigned a symbolic value instead of an actual value. FIG. 1 illustrates an example execution flow 100 representing the steps of performing symbolic execution on module "foo". In this example, input variable "a" is assigned symbolic value "x"; input variable "b" is assigned symbolic value "y"; intermediate variable "c" is assigned symbolic value "z"; and intermediate variable "d" is assigned symbolic value "w". Since variables "a", "b", "c", and "d" are of type "string", symbolic values "x", "y", "z", and "w" each represent an arbitrary string.

In addition, "Φ" is the symbolic expression that represents the result of the symbolic execution at various points along the execution paths. More specifically, at 102, which corresponds to line 2 of the code, variables "a", "b", "c", and "d" are assigned their respective symbolic values "x", "y", "z", and "w", and "Φ" initially has an empty or null expression. As the execution proceeds further, expressions are added to "Φ" depending on what code has been executed. At 104, which corresponds to line 3 of the code, "Φ" has the expression "z=concat (x,y)" because line 3 of the code is "c=a.concat (b)" and "x", "y", and "z" are the symbolic value assigned to variable "a", "b", and "c", respectively. Next, line 4 of the code is a conditional branching point and there are two possible execution paths down which the execution may proceed. Thus, the symbolic execution may also proceed down two different paths from 104: the first path, path 1, includes 106 and 108 corresponding to lines 5 and 6 of the code; and the second path, path 2, includes 110 corresponding to line 8 of the code.

In order to proceed down path 1, variable "c" does not equal "qrs", which means symbolic value "z" does not equal "qrs". Therefore, the expression "z!="qrs"" is added to "Φ" at 106. Conversely, in order to proceed down path 2, variable "c" does equal "qrs", which means symbolic value "z" equals "qrs". Therefore, the expression "z="qrs"" is added to "Φ" at 110. Along path 1, the value of variable "d" is determined at line 5 of the code, which corresponds to 108. Therefore, the expression "w=concat (z, "t")" is added to "Φ" at 108. Note that because "z=concat (x,y)", the expression for "w" may be rewritten as "w=concat (concat (x,y), "t")". 108 is the end of path 1, and thus, the expression of "Φ" at 108 represents the conditions, in symbolic form, that need to be satisfied in order to reach the end of path 1. Similarly, 110 is the end of path 2, and thus, expression of "Φ" at 110 represents the conditions, in symbolic form, that need to be satisfied in order to reach the end of path 2.

In particular embodiments, solving for the expression of "Φ" at 108 may provide the actual values for input variables "a" and "b" that cause module "foo" to reach the end of path 1; and solving for the expression of "Φ" at 110 may provide the actual values for input variables "a" and "b" that cause module "foo" to reach the end of path 2. In particular embodiments, these actual values may then be used as test values that may be assigned to input variables "a" and "b" when testing module "foo". Since the test values include actual values for input variables "a" and "b" that cause module "foo" to reach both the end of path 1 and the end of path 1, it may be assured that all possible execution paths of module "foo" are tested if these test values are applied.

As mentioned before, since symbolic execution is expensive, usually, only one input variable is made symbolic at a time and executed symbolically. If a software module has multiple input variables, symbolic execution needs to be performed iteratively over all input variables one at a time. The order in which the input variables are chosen to be made symbolic may have a huge impact on the quality of the automatically generated test set in terms of final coverage. For example, consider the following code segment:

```
1      if (a > 5) {
2          ...
3          if (b > 2) {
4              ...
5          } else {
6              ...
```

```
7              }
8              } else {
9                  ...
10             }
```

SAMPLE CODE 2

Suppose "a" and "b" are input variables. If input variable "a" is made symbolic first, then performing symbolic execution may result in, for example, two concrete (i.e., actual) values for variable "a", 6 and 4, which correspond to the clause "(a>5)" at line 1. With the concrete values of "a" being 6 and 4, if "b" is made symbolic second, then two more concrete values for "b", 1, and 3, may result from performing symbolic execution. The input value pairs for (a, b)={(6, 1), (6, 3), (4, 1), (4,3)} are guaranteed to cover all possible execution paths through the above code segment.

On the other hand, instead of input variable "a" being made symbolic first, suppose input variable "b" is selected first to be made symbolic. Since, during symbolic execution, some concrete value needs to be assumed for input variable "a", "a" may be assigned a random value. If the value of "a" is assumed to be less than 5, then symbolic execution will miss the "if" block at lines 3 and 4 entirely. As result, it will not be able to generate any meaningful value for variable "b". The final resulting test set will only have the two values of "a", which are subsequently calculated with some random value generated for input variable "b". The resulting test set may look something like (a, b)={(6, 7), (4, 7)}, where 7 is the random value assigned to input variable "b". This second test set will result in test input values that provide much worse code coverage than those resulted from the first test set. Consequently, the order at which input variables are made symbolic for the purpose of symbolic execution may have huge impact on the level of the final code coverage obtained by the automatically generated test set.

Figure 2:
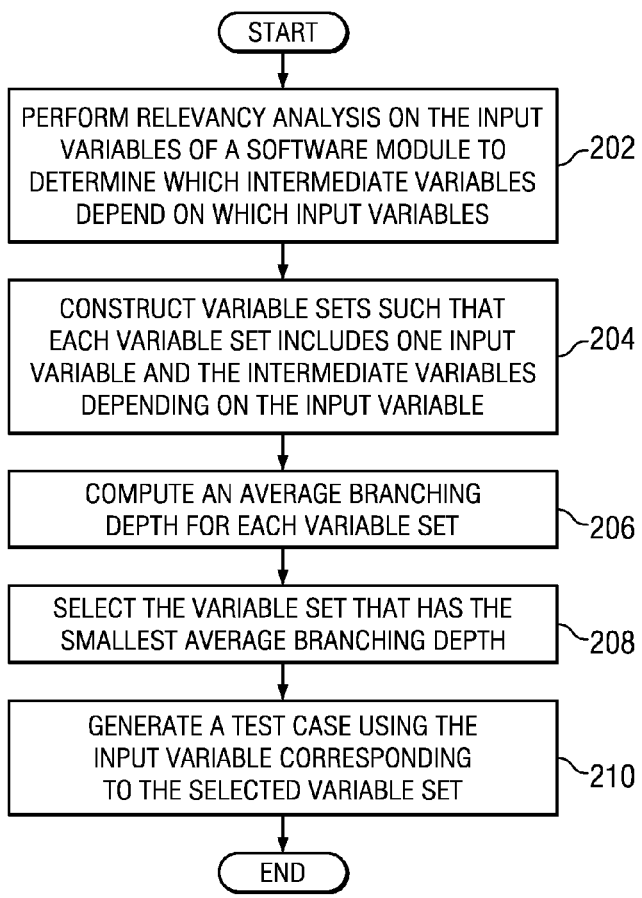
FIG. 2 illustrates an example method for determining the order for symbolically executing the input variables of a software module
Figure 3:
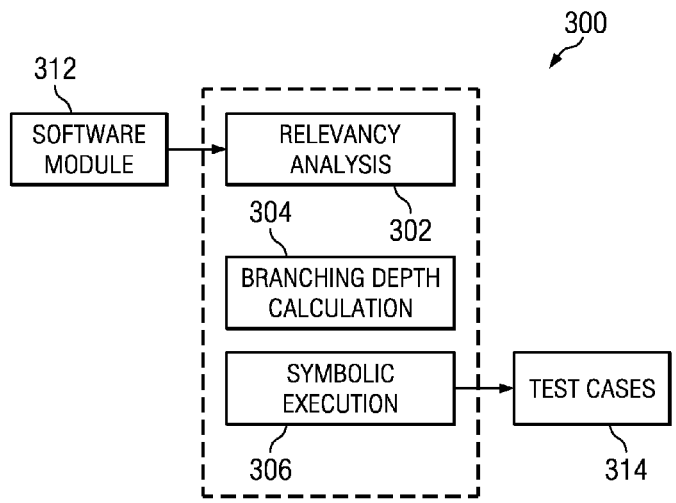
FIG. 3 illustrates an example system for determining the order for symbolically executing the input variables of a software module.

To address this possible problem, particular embodiments may intelligently determine the order for symbolically executing the input variables of a software module. FIG. 2 illustrates an example method for determining the order for symbolically executing the input variables of a software module, and FIG. 3 illustrates an example system 300 for determining the order for symbolically executing the input variables of a software module. FIGS. 2 and 3 are described in connection with each other.

In particular embodiments, a software module may have any number of input variables and any number of intermediate variables. In particular embodiments, the value of each intermediate variable may depend, directly or indirectly, on the value of at least one input variable. That is, a change to the value of an input variable results in a change to the value of an intermediate variable that directly or indirectly depends on the input variable. Of course, an intermediate variable may depend on multiple input variables, and multiple intermediate variables may depend on the same input variable. Particular embodiments may determine which intermediate variable depends, directly or indirectly, on which input variable of a software module by performing relevancy analysis on the input variables, as illustrated in step 202 of FIG. 2. In particular embodiments, step 202 may be performed by component 302 of system 300 illustrated in FIG. 3, which takes a software module 312 as input and performs relevancy analysis on the input variables of software module 312.

In particular embodiments, relevancy analysis may compute a set of variables of a software module that is relevant to a set of symbolic variables. Particular embodiments may consider a variable as relevant if it may store a symbolic value given a set of symbolic inputs, which is based on the insight that software analysis may be regarded as model checking of abstract interpretation. As a result, software analysis enjoys the soundness guarantee from abstract interpretation and the automation advantages from model checking. In particular embodiments, the relevancy analysis performed on software module 312 may be based on weighted pushdown model checking techniques. Relevancy analysis is described in more details in U.S. Patent Publication 2010-0223599 A1, filed on 27 Feb., 2009, entitled "Efficient Symbolic Execution of Software Using Static Analysis", and U.S. Patent Publication 2010-0242029 A1, filed on 19 Mar., 2009, entitled "Environment Data Refinement Based on Static Analysis and Symbolic Execution".

Once it has been determined which variable depends on which input variable of the software module, particular embodiments may construct a variable set for each input variable, as illustrated in step 204 of FIG. 2. The variable set includes the input variable itself and all the intermediate variables that directly or indirectly depend on the input variable, according to the result of the relevancy analysis. The number of variable sets thus constructed equals the number of input variables the software module has. Note that an intermediate variable may belong to multiple variable sets since the intermediate variable may depend on multiple input variables.

For each variable set, particular embodiments may compute an average branching depth reached by the input and intermediate variables from the set, as illustrated in step 206 of FIG. 2. In particular embodiments, step 206 may be performed by component 304 of system 300 illustrated in FIG. 3. In particular embodiments, the software module may have any number of conditional branching points (e.g., "if" statements), and each conditional branching point has a branching condition specified by at least one input or intermediate variable. Depending on whether the branching condition is satisfied, the software module may proceed down different execution paths. For example, consider the following code segment:

```
1    if (m > n && k <= 10) {
2        ...
3        if (k > 2) {
4            ...
5        } else {
6            if (n == k || n == m) {
7                ...
8            } else {
9                ...
10           }
11       }
12   } else {
13       ...
14   }
```

At line 1 there is a conditional branching point, and the branching condition is "m>n && k<=10". Note that a branching condition may include multiple sub conditions (e.g., "m>n" and "k<=10"). For the branching condition at line 1 to be satisfied (i.e., to hold true), the value of variable "m" needs to be greater than the value of variable "n", and the value of variable "k" needs to be less than or equal to 10. If the branching condition at line 1 is satisfied, then the code between lines 2-11 is executed. Otherwise (i.e., if the branching condition at line 1 is not satisfied), then the code at line 13 is executed. At line 3 there is another conditional branching point, and the branching condition is "k>2". For the branching condition at line 3 to be satisfied, the value of variable "k" needs to be greater than 2. Similarly, if the branching condition at line 3 is satisfied, then the code at line 4 is executed. Otherwise, the code between lines 6-11 is executed. At line 6 there is a third conditional branching point, and the branching condition is "n==k||n==m", which also includes multiple sub conditions (e.g., "n==k" and "n==m"). For the branching condition at line 6 to be satisfied, the value of variable "n" needs to equal either the value of variable "k" or the value of variable "m". If the branching condition at line 6 is satisfied, then the code at line 7 is executed. Otherwise, the code at line 9 is executed.

Figure 4:
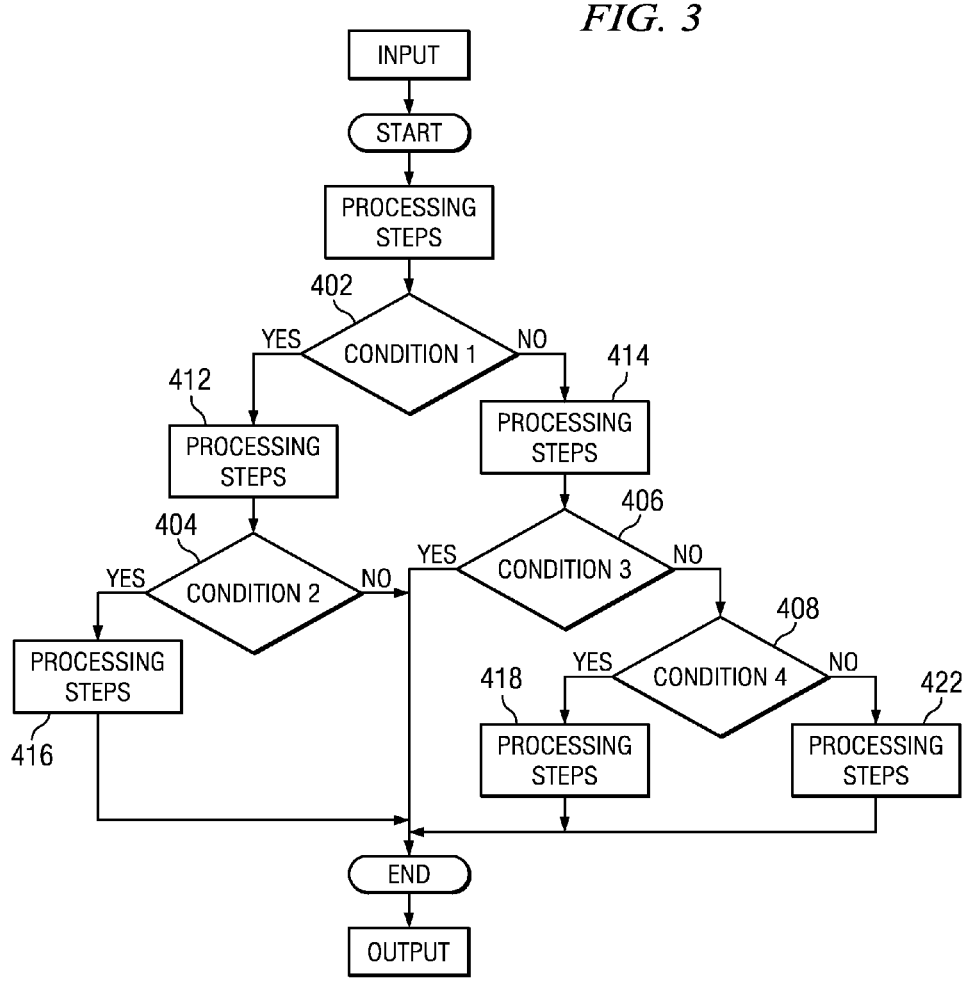
FIG. 4 illustrates execution paths of an example software module that has multiple levels of nested conditional branches.

Furthermore, the conditional branching point at line 3 is nested within the conditional branching point at line 1, and the conditional branching point at line 6 is further nested within the conditional branching point at line 3. If the branching condition associated with the conditional branching point at line 1 is not satisfied, the conditional branching point at line 3 is never reached during execution of the code. However, if the branching condition associated with the conditional branching point at line 3 is not satisfied, the conditional branching point at line 6 is reached during execution of the code. In fact, in order to reach the conditional branching point at line 6, the branching condition at line 1 needs to be satisfied but the branching condition at line 3 cannot be satisfied FIG. 4 illustrates execution paths of an example software module that has multiple levels of nested conditional branches. At conditional branching point 402, if "CONDITION 1" is satisfied, the execution path proceeds toward processing steps 412, and if "CONDITION 1" is not satisfied, the execution path proceeds toward processing steps 414. At conditional branching point 404, which is nested within conditional branching point 402, if "CONDITION 2" is satisfied, the execution path proceeds toward processing steps 416, and if "CONDITION 2" is not satisfied, the execution path ends. At conditional branching point 406, which is also nested within conditional branching point 402, if "CONDITION 3" is satisfied, the execution path ends, and if "CONDITION 3" is not satisfied, the execution path proceeds toward conditional branching point 408. And at conditional branching point 408, which is further nested within conditional branching point 406, if "CONDITION 4" is satisfied, the execution path proceeds toward processing steps 418, and if "CONDITION 4" is not satisfied, the execution path proceeds toward processing steps 422. In FIG. 4, there are a total of three nested levels of conditional branches.

To compute the average branching depth reached by the input and intermediate variables from one of the variable sets, for the input variable and each of the intermediate variables from the set, particular embodiments may compute a branching depth reached by the input or intermediate variable. Then, particular embodiments may average the branching depths computed for all the individual input and intermediate variables to determine the average branching depth for the variable set. To compute the branching depth reached by one of the variables from the variable set, particular embodiments may examine each of the conditional branching points in the software module, starting from the outmost conditional branching point and gradually proceeding toward the inner, nested conditional branching points. If the variable affects the branching condition associated with a conditional branching point, then particular embodiments may increment the branching depth of the variable by 1. In the above example code segment, the branching condition associated with the conditional branching point at line 1 is affected by variables "m", "n", and "k", because all three variables are involved with the sub conditions that together form the branching condition. On the other hand, the branching condition associated with the conditional branching point at line 3 is only affected by variable "k", because only variable "k" is involved with the branching condition.

Once the average branching depths have been thus computed for all the variable sets, particular embodiments may select the variable set that has the smallest average branching depth, as illustrated in step 208 of FIG. 2. If there are multiple variable sets that all have the same smallest average branching depth, then particular embodiments may randomly select one of the variable sets that have the smallest average branching depth.

Particular embodiments may perform symbolic execution on the input variable from the selected variable set to generate test cases for the software module, as illustrated in step 210 of FIG. 2. In particular embodiments, step 210 may be performed by component 306 of system 300 illustrated in FIG. 3, which provides as output a set of test cases 314. As described above in connection with FIG. 1, particular embodiments may assign a symbolic value to the input variable from the selected variable set, perform symbolic execution on the software module, solve for the symbolic expressions (e.g., "Φ") obtained at the end of the different execution paths to obtain actual values for the input variable from the selected variable set, which may then be used as test values to be applied to the input variable when the software module is tested. These actual values for the input variable may be used to generate test cases for the software module. Particular embodiments may repeat this process multiple times, each time selecting another variable set. For example, during the second iteration, the variable set that has the second smallest average branching depth may be selected, and symbolic execution may be performed on the software module with the input variable from this second variable set having a symbolic value. The actual values may be determined for this input variable based on the result of the symbolic execution. Again, if multiple variable sets have the same average branching depth during this iteration, one of the variable sets may be selected randomly. During the third iteration, the variable set that has the third smallest average branching depth may be selected, and symbolic execution may be performed on the software module with the input variable from this third variable set having a symbolic value. And so on, until sufficient test cases are obtained for the software module. In other words, the variable set that has the smallest average branching depth during each iteration is selected for that iteration, and the actual values are determined for the input variable from the selected variable set.

Figure 5:
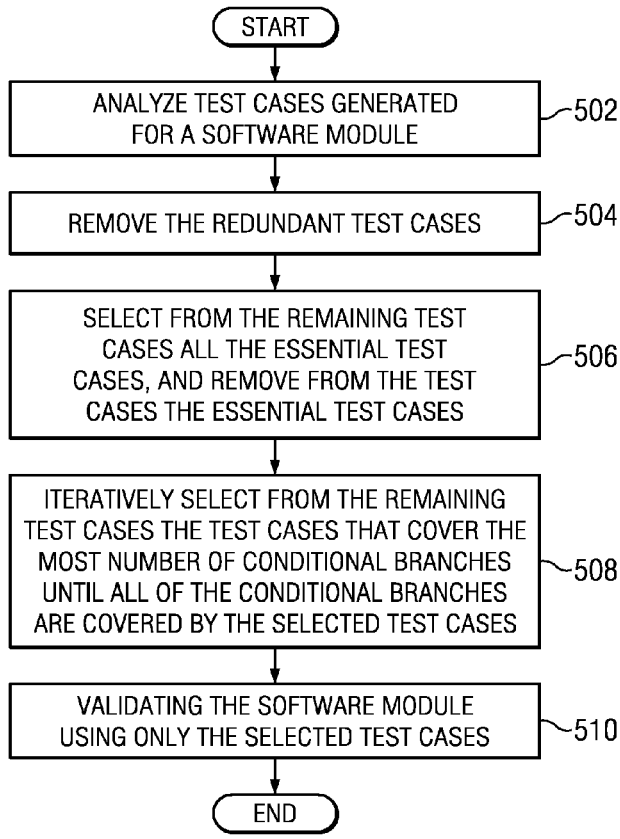
FIG. 5 illustrates an example method for reducing the size of a set of test cases.
Figure 6:
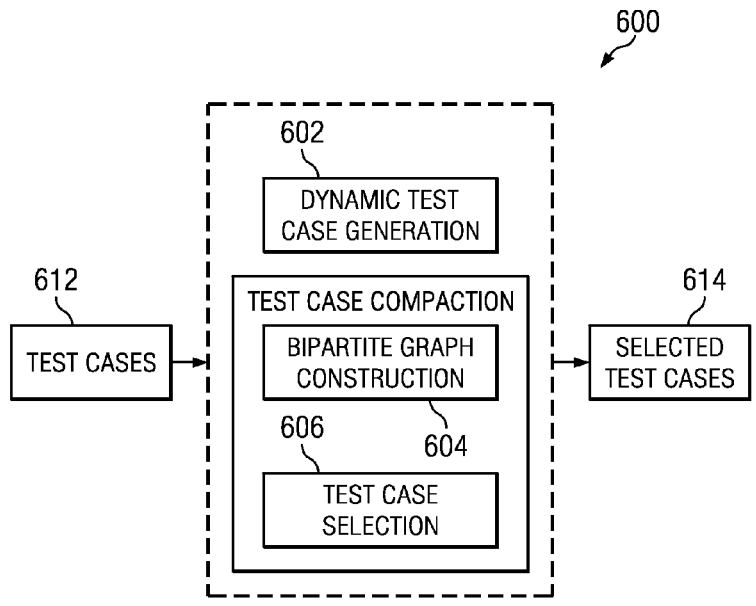
FIG. 6 illustrates an example system for reducing the size of a set of test cases.

Given a set of test cases generated for a software module either through the process illustrated in FIG. 2 or some other suitable means, sometimes, not all the test cases from the set may provide valuable test coverage on the software module, and yet applying all these test cases to test the software module may require a lot of resources (e.g., in terms of computer resources). Particular embodiments may examine the coverage value of the individual test cases from the set of test cases and select only a subset of the test cases for testing the software module. FIG. 5 illustrates an example method for reducing the size of a set of test cases, and FIG. 6 illustrates an example system 600 for reducing the size of a set of test cases. FIGS. 5 and 6 are described in connection with each other.

As described above, in particular embodiments, a software module may have any number of input variables, any number of intermediate variables that each directly or indirectly depend on at least one of the input variables, and any number of conditional branching points. Each conditional branching point is associated with a branching condition that is affected by at least one of the input or intermediate variables. In particular embodiments, for a given input variable, all the conditional branching points that have branching conditions that are either affected by the input variable itself or by any intermediate variable that directly or indirectly depends on the input variable is considered to be affected by the input variable. For example, suppose intermediate variable "j" depends on input variable "i". Further suppose that one conditional branching point has a branching condition that is affected by input variable "i", and another conditional branching point has a branching condition that is affected by intermediate variable "j". In this case, both conditional branching points are considered to be affected by input variable "i" because intermediate variable "j" depends on input variable "i".

In particular embodiments, for the set of test cases, each test case from the set may include a combination of actual values that may be applied to the input variables of the software module as test input values during the testing of the software module. For example, suppose that a software module has three input variables, "a", "b", and "c" of the type "integer". Further suppose that it has been determined that input variable "a" may have actual values 2 and 7, input variable "b" may have actual values 5 and 11, and input variable "c" may have actual values 52, 9, and 27. From these actual values for the three input variables, a set of twelve possible test cases may be generated for the software module, because there are twelve unique combinations of the three sets of actual values:

| TEST CASE | VALUE FOR "a" | VALUE FOR "b" | VALUE FOR "c" |
|---|---|---|---|
| 1 | 2 | 5 | 52 |
| 2 | 2 | 5 | 9 |
| 3 | 2 | 5 | 7 |
| 4 | 2 | 11 | 52 |
| 5 | 2 | 11 | 9 |
| 6 | 2 | 11 | 7 |
| 7 | 7 | 5 | 52 |
| 8 | 7 | 5 | 9 |
| 9 | 7 | 5 | 7 |
| 10 | 7 | 11 | 52 |
| 11 | 7 | 11 | 9 |
| 12 | 7 | 11 | 7 |

Particular embodiments may analyze a set of test cases generated for a software module, as illustrated in step 502 of FIG. 5. In particular embodiments, step 502 may be performed by component 602 of system 600 illustrated in FIG. 6, which takes as input a set of test cases 612 for analysis and attempts to reduce the size of test-case set 612 by removing redundant test cases from test-case set 612.

The individual conditional branching points of the software module are affected by the input variables. That is, different actual values assigned to an input variable as testing values may cause the software module to proceed down different execution paths leading from a conditional branching point affected by the input variable. In the above example, suppose input variable "a" affects a conditional branching point "cbp1". From conditional branching point "cbp1", the software module may proceed down two different execution paths. More specifically, if input variable "a" is assigned test value 2, software module may proceed down one execution path, and if input variable "a" is assigned test value 7, software module may proceed down another execution path. In this case, all the test cases where the value for input variable "a" is 2 cover the first execution path and there are six such test cases in the above example. Similarly, all the test cases where the value for input variable "a" is 7 cover the second execution path and there are again six such test cases in the above example.

Figure 7:
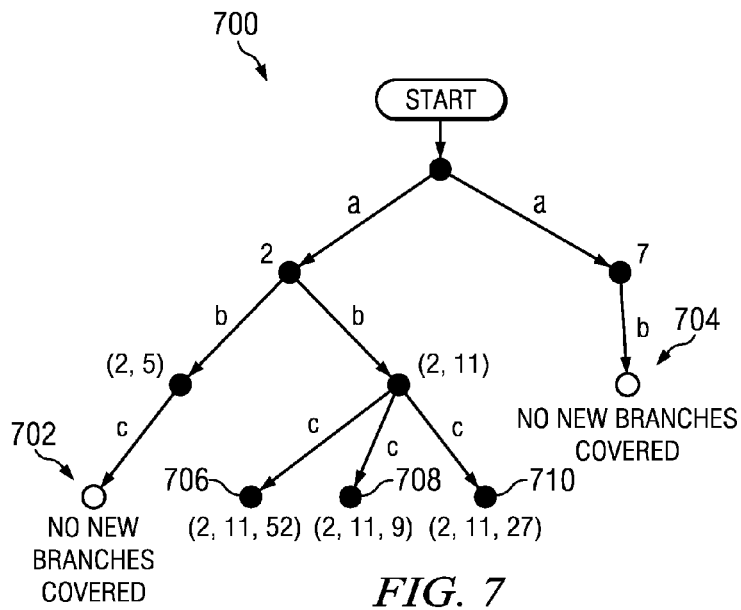
FIG. 7 illustrates an example graph representing example test values for example input variables of an example software module.

Particular embodiments may construct a graph representing the test values from the set of test cases, which may be assigned to the individual input variables, and FIG. 7 illustrates an example graph 700 constructed for the above example with input variables "a", "b", and "c". Each edge in graph 700 represents an input variable, and each node in graph 700 represents a possible test value for an input variable from the twelve test cases illustrated above. Traversing along different paths of graph 700 eventually leads to different test cases. In particular embodiments, such a graph may help identify which test case covers which execution path of the software module. In particular embodiments, if there are multiple test cases that cover the same execution path, then all but one of the redundant test cases may be removed from the set of test cases, as illustrated in step 504 of FIG. 2, because the additional test cases do not really provide any additional test coverage for the software module. This may reduce the size of the set of test cases. For example, in FIG. 7, at nodes 702 and 704, it may be determined that the subsequent branches of graph 700 from nodes 702 and 704 do not provide new test coverage on the execution paths of the software module that are not covered by the test cases at nodes 706, 708, and 710. Therefore, all the test cases below nodes 702 and 704 may be removed from the set of test cases.

Figure 8:
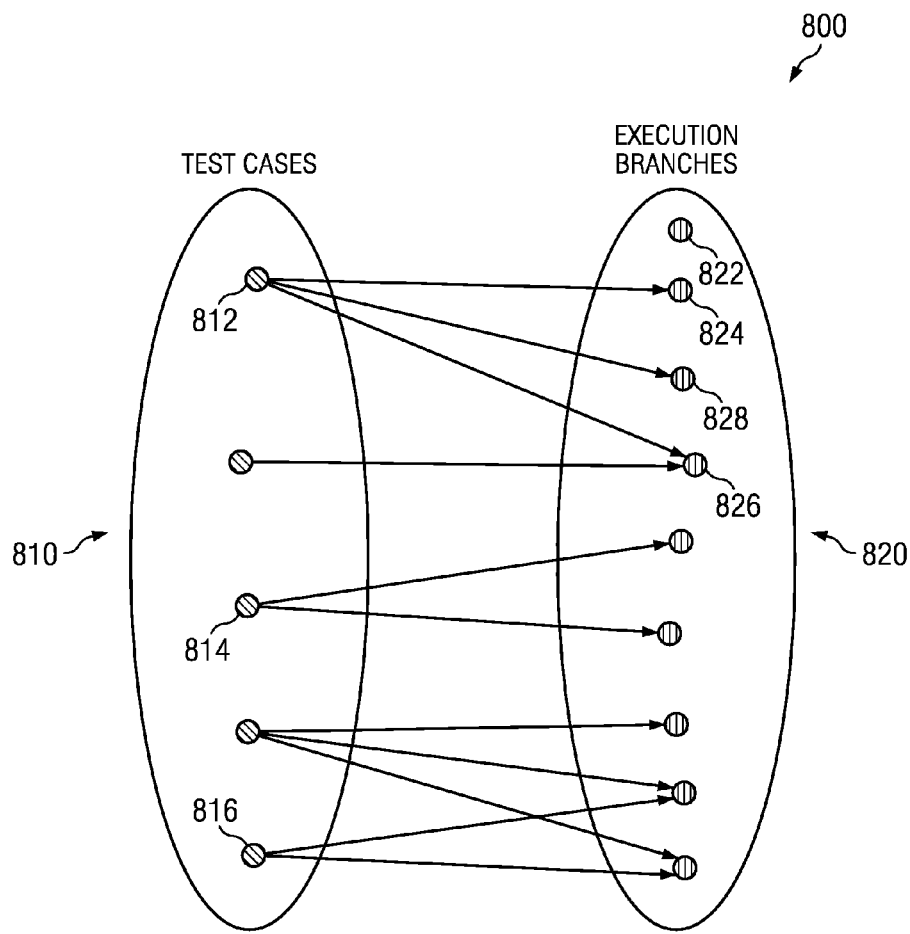
FIG. 8 illustrates an example bipartite graph illustrates test coverage on execution paths of an example software module.

Using a graph, such as graph 700 illustrated in FIG. 7, may not be able to remove all the redundant test cases from the set of test cases. Particular embodiments may further reduce the size of the set of test cases (e.g., further perform test set compaction) based on a bipartite graph, an example of which is illustrated in FIG. 8. In particular embodiments, a bipartite graph, such as the one illustrated in FIG. 8, may be constructed for the test cases and the conditional branches of the software module by component 604 of system 600 illustrated in FIG. 6. In particular embodiments, a bipartite graph (e.g., bipartite graph 800) may include two parts. One part (e.g., 810) represents the remaining test cases from the test-case set, with each node representing one of the remaining test cases. Another part (e.g., 820) represents all the possible conditional branches of the software module, with each node representing one of the conditional branches. If a test case covers a conditional branch, then a directed edge links the node in part 810 representing the test case to the node in part 820 representing the conditional branch. It is possible that a conditional branch is not covered by any available test case (e.g., node 822), by only one test case (e.g., node 824), or by multiple test cases (e.g., node 826).

Once a bipartite graph (e.g., bipartite graph 800) has thus been constructed, particular embodiments may iteratively select the test cases using a greedy algorithm, as illustrated in steps 506 and 508 of FIG. 5. In particular embodiments, steps 506 and 508 may be performed by component 606 of system 600 illustrated in FIG. 6, which provides as output a subset of test cases 614 selected from test-case set 612. Particular embodiments may first select all the essential test cases in the bipartite graph that uniquely cover at least one of the conditional branches, as illustrated in step 506 of FIG. 5. That is, each of the essential test cases selected is the only test case that covers a particular conditional branch. For example, in FIG. 8, node 812 represents an essential test case because this test case is the only test case that covers conditional branches represented by nodes 824 and 828. Similarly, node 814 also represents an essential test case. These test cases are selected first. However, node 816 does not represent an essential test case because it does not uniquely cover any conditional branch; therefore, this test case is not selected at this point.

Once all the essential test cases are selected, they may be removed from the bipartite graph. Also the conditional branches that the essential test cases cover may be removed from the bipartite graph. Next, from the remaining test cases in the bipartite graph, particular embodiments may iteratively select the test case that covers the most number of conditional branches one at a time, and then remove that selected test case from the bipartite graph, until all the conditional branches covered by the available test cases are covered by the selected test cases, as illustrated in step 508 of FIG. 5. If there is any conditional branch that is not covered by any available test case (e.g., the conditional branch represented by node 822 in FIG. 8), then particular embodiments may ignore it for the purpose of the greedy algorithm. Thereafter, particular embodiments may test the software module using only the selected test cases, as illustrated in step 510 of FIG. 5.

Figure 9:
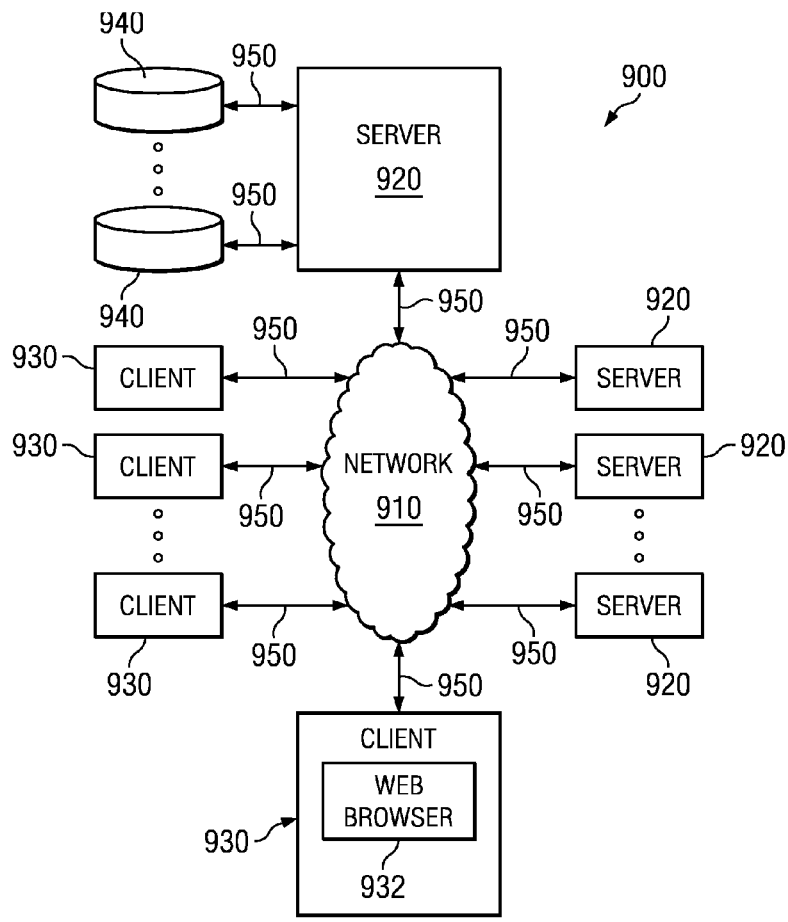
FIG. 9 illustrates an example network environment.

In particular embodiments, the components illustrated in FIGS. 3 and 6 may be implemented as computer hardware or software. Particular embodiments may be implemented in a network environment. FIG. 9 illustrates an example network environment 900 suitable for providing software validation as a service. Network environment 900 includes a network 910 coupling one or more servers 920 and one or more clients 930 to each other. In particular embodiments, network 910 is an intranet, an extranet, a virtual private network (VPN), a local area network (LAN), a wireless LAN (WLAN), a wide area network (WAN), a metropolitan area network (MAN), a portion of the Internet, or another network 910 or a combination of two or more such networks 910. This disclosure contemplates any suitable network 910.

One or more links 950 couple a server 920 or a client 930 to network 910. In particular embodiments, one or more links 950 each includes one or more wireline, wireless, or optical links 950. In particular embodiments, one or more links 950 each includes an intranet, an extranet, a VPN, a LAN, a WLAN, a WAN, a MAN, a portion of the Internet, or another link 950 or a combination of two or more such links 950. This disclosure contemplates any suitable links 950 coupling servers 920 and clients 930 to network 910.

In particular embodiments, each server 920 may be a unitary server or may be a distributed server spanning multiple computers or multiple datacenters. Servers 920 may be of various types, such as, for example and without limitation, web server, news server, mail server, message server, advertising server, file server, application server, exchange server, database server, or proxy server. In particular embodiments, each server 920 may include hardware, software, or embedded logic components or a combination of two or more such components for carrying out the appropriate functionalities implemented or supported by server 920. For example, a web server is generally capable of hosting websites containing web pages or particular elements of web pages. More specifically, a web server may host HTML files or other file types, or may dynamically create or constitute files upon a request, and communicate them to clients 930 in response to HTTP or other requests from clients 930. A mail server is generally capable of providing electronic mail services to various clients 930. A database server is generally capable of providing an interface for managing data stored in one or more data stores.

In particular embodiments, one or more data storages 940 may be communicatively linked to one or more severs 920 via one or more links 950. In particular embodiments, data storages 940 may be used to store various types of information. In particular embodiments, the information stored in data storages 940 may be organized according to specific data structures. In particular embodiment, each data storage 940 may be a relational database. Particular embodiments may provide interfaces that enable servers 920 or clients 930 to manage, e.g., retrieve, modify, add, or delete, the information stored in data storage 940.

In particular embodiments, each client 930 may be an electronic device including hardware, software, or embedded logic components or a combination of two or more such components and capable of carrying out the appropriate functionalities implemented or supported by client 930. For example and without limitation, a client 930 may be a desktop computer system, a notebook computer system, a netbook computer system, a handheld electronic device, or a mobile telephone. This disclosure contemplates any suitable clients 930. A client 930 may enable a network user at client 930 to access network 930. A client 930 may enable its user to communicate with other users at other clients 930.

A client 930 may have a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 930 may enter a Uniform Resource Locator (URL) or other address directing the web browser 932 to a server 920, and the web browser 932 may generate a Hyper Text Transfer Protocol (HTTP) request and communicate the HTTP request to server 920. Server 920 may accept the HTTP request and communicate to client 930 one or more Hyper Text Markup Language (HTML) files responsive to the HTTP request. Client 930 may render a web page based on the HTML files from server 920 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 10:
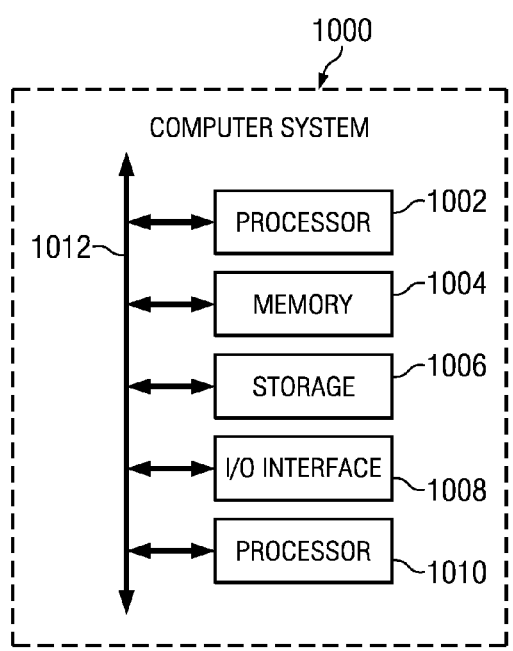
FIG. 10 illustrates an example computer system.

Particular embodiments may be implemented on one or more computer systems. FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, executed by one or more computing devices:
   accessing a software module, wherein:
      the software module comprises:
         one or more input variables;
         one or more intermediate variables, wherein a value of each one of the intermediate variables directly or indirectly depends on at least one value of at least one of the input variables; and
         one or more conditional branching points, wherein each one of the conditional branching points has a branching condition specified by at least one of the input or intermediate variables, and whether the branching condition is satisfied depend on at least one value of the at least one of the input or intermediate variables; and during execution of the software module, at each one of the conditional branching points, the software module proceeds down different paths depending on whether the branching condition of the conditional branching point is satisfied;

constructing one or more sets of variables corresponding to the input variables, wherein each one of the sets of variables comprises one of the input variables and the intermediate variables whose values directly or indirectly depend on the value of the one of the input variables;

for each one of the sets of variables, computing an average branching depth that is affected by the input and intermediate variables of the set of variables;

selecting a first one of the sets of variables that has the smallest average branching depth;

assigning a first symbolic value to the input variable of the first one of the sets of variables;

symbolically executing the software module, with the input variable of the first one of the sets of variables having the first symbolic value, to generate a first set of test cases for the input and intermediate variables of the first set of variables; and validating the software module using the first set of test cases.

2. The method of claim 1, further comprising for each one of the input variables, determining which ones of the intermediate variables whose values directly or indirectly depend on the value of the input variable using relevancy analysis.

3. The method of claim 1, wherein:
the software module comprises one or more branching levels;
each one of the branching levels comprises at least one of the conditional branching points; and
for each one of the sets of variables, computing the average branching depth that is caused by the input and intermediate variables of the set of variables comprises:
for the input variable of the set of variables, computing a number of branching levels that have conditional branching points whose branching conditions depend on the input variable;
for each one of the intermediate variables of the set of variables, computing a number of branching levels that have conditional branching points whose branching conditions depend on the intermediate variable; and
computing an average of the numbers of branching levels as the average branching depth for the set of variables.

4. The method of claim 1, wherein when selecting the first one of the sets of variables that has the smallest average branching depth, if there are multiple ones of the sets of variables that have the smallest average branching depth, then randomly selecting one of the sets of variables that have the smallest average branching depth as the first set of variables.

5. The method of claim 1, further comprising:
selecting a second one of the sets of variables that has the next smallest average branching depth;
assigning a second symbolic value to the input variable of the second one of the sets of variables;
symbolically executing the software module, with the input variable of the second one of the sets of variables having the second symbolic value, to generate a second set of test cases for the input and intermediate variables of the second set of variables; and
validating the software module using the second set of test cases.

6. A method comprising, executed by one or more computing devices:
accessing a software module and a plurality of test cases for the software module, wherein:
the software module comprises:
one or more variables; and
one or more conditional branching points, wherein each one of the conditional branching points has a branching condition specified by at least one of the variables, and whether the branching condition is satisfied depend on at least one value of the at least one of the variables; and
during execution of the software module, at each one of the conditional branching points, the software module proceeds down different paths depending on whether the branching condition of the conditional branching point is satisfied;
each one of the test cases covers at least one of the conditional branching points and comprises at least one test value for the at least one of the variables that specify the branching conditions of the at least one of the conditional branching points;
for each one of the conditional branching points, if there are multiple ones of the test cases covering the conditional branching points that cause the software module to proceed down the same path during execution, then removing from the test cases all except one of the multiple ones of the test cases covering the conditional branching points that cause the software module to proceeding down the same path;
selecting from the remaining test cases one or more first test cases, wherein for each one of the first test cases, at least one of the conditional branching points is covered only by the first test case;
iteratively selecting from the remaining test cases one or more second test cases, wherein the second test case selected during each iteration covers the most number of the conditional branching points during that iteration, until all of the conditional branching points are covered by at least one of the first or second test cases; and
testing the software module using only the selected first and second test cases.

7. The method of claim 6, wherein the variables of the software module comprise one or more input variables and one or more intermediate variables, wherein a value of each one of the intermediate variables directly or indirectly depends on at least one value of at least one of the input variables.

8. The method of claim 7, further comprising constructing a graph representing the input variables and the test values from the test cases that are for the input variables, wherein the graph comprises:
one or more levels corresponding to the input variables, wherein each one of the levels is associated with one of the input variables;
one or more nodes at each one of the levels; and
one or more edges, wherein each one of the edges links two of the nodes from two of the adjacent levels and represents one of the test values for the input variable associated with the higher one of the two adjacent levels.

9. The method of claim 6, further comprising constructing a bipartite graph representing the test cases and the conditional branching points, wherein the bipartite graph comprises:
- a plurality of first nodes corresponding to the test cases, wherein each one of the first nodes represents one of the test case;
- one or more second nodes corresponding to the conditional branching points, wherein each one of the second nodes represents one of the conditional branching points;
- a plurality of edges, wherein each one of the edges links one of the first nodes and one of the second nodes, wherein the test case represented by the one of the first nodes covers the conditional branching point represented by the one of the second nodes.

10. A system comprising:
- a memory comprising instructions executable by one or more processors; and
- one or more processors coupled to the memory and operable to execute the instructions, the one or more processors being operable when executing the instructions to:
  - access a software module, wherein:
    - the software module comprises:
      - one or more input variables;
      - one or more intermediate variables, wherein a value of each one of the intermediate variables directly or indirectly depends on at least one value of at least one of the input variables; and
      - one or more conditional branching points, wherein each one of the conditional branching points has a branching condition specified by at least one of the input or intermediate variables, and whether the branching condition is satisfied depend on at least one value of the at least one of the input or intermediate variables; and
    - during execution of the software module, at each one of the conditional branching points, the software module proceeds down different paths depending on whether the branching condition of the conditional branching point is satisfied;
  - construct one or more sets of variables corresponding to the input variables, wherein each one of the sets of variables comprises one of the input variables and the intermediate variables whose values directly or indirectly depend on the value of the one of the input variables;
  - for each one of the sets of variables, compute an average branching depth that is affected by the input and intermediate variables of the set of variables;
  - select a first one of the sets of variables that has the smallest average branching depth;
  - assign a first symbolic value to the input variable of the first one of the sets of variables;
  - symbolically execute the software module, with the input variable of the first one of the sets of variables having the first symbolic value, to generate a first set of test cases for the input and intermediate variables of the first set of variables; and
  - validate the software module using the first set of test cases.

11. The system of claim 10, wherein the processors are further operable when executing the instructions to for each one of the input variables, determine which ones of the intermediate variables whose values directly or indirectly depend on the value of the input variable using relevancy analysis.

12. The system of claim 10, wherein:
- the software module comprises one or more branching levels;
- each one of the branching levels comprises at least one of the conditional branching points; and
- for each one of the sets of variables, compute the average branching depth that is caused by the input and intermediate variables of the set of variables comprises:
  - for the input variable of the set of variables, compute a number of branching levels that have conditional branching points whose branching conditions depend on the input variable;
  - for each one of the intermediate variables of the set of variables, compute a number of branching levels that have conditional branching points whose branching conditions depend on the intermediate variable; and
  - compute an average of the numbers of branching levels as the average branching depth for the set of variables.

13. The system of claim 10, wherein when selecting the first one of the sets of variables that has the smallest average branching depth, if there are multiple ones of the sets of variables that have the smallest average branching depth, then randomly select one of the sets of variables that have the smallest average branching depth as the first set of variables.

14. The system of claim 10, wherein the processors are further operable when executing the instructions to:
- select a second one of the sets of variables that has the next smallest average branching depth;
- assign a second symbolic value to the input variable of the second one of the sets of variables;
- symbolically execute the software module, with the input variable of the second one of the sets of variables having the second symbolic value, to generate a second set of test cases for the input and intermediate variables of the second set of variables; and
- validate the software module using the second set of test cases.

15. A system comprising:
- a memory comprising instructions executable by one or more processors; and
- one or more processors coupled to the memory and operable to execute the instructions, the one or more processors being operable when executing the instructions to:
  - access a software module and a plurality of test cases for the software module, wherein:
    - the software module comprises:
      - one or more variables; and
      - one or more conditional branching points, wherein each one of the conditional branching points has a branching condition specified by at least one of the variables, and whether the branching condition is satisfied depend on at least one value of the at least one of the variables; and
    - during execution of the software module, at each one of the conditional branching points, the software module proceeds down different paths depending on whether the branching condition of the conditional branching point is satisfied;
    - each one of the test cases covers at least one of the conditional branching points and comprises at least one test value for the at least one of the variables that specify the branching conditions of the at least one of the conditional branching points;
  - for each one of the conditional branching points, if there are multiple ones of the test cases covering the conditional branching points that cause the software module to proceed down the same path during execution, then remove from the test cases all except one of the multiple ones of the test cases covering the conditional branching points that cause the software module to proceeding down the same path;

select from the remaining test cases one or more first test cases, wherein for each one of the first test cases, at least one of the conditional branching points is covered only by the first test case;

iteratively select from the remaining test cases one or more second test cases, wherein the second test case selected during each iteration covers the most number of the conditional branching points during that iteration, until all of the conditional branching points are covered by at least one of the first or second test cases; and test the software module using only the selected first and second test cases.

16. The system of claim 15, wherein the variables of the software module comprise one or more input variables and one or more intermediate variables, wherein a value of each one of the intermediate variables directly or indirectly depends on at least one value of at least one of the input variables.

17. The system of claim 16, wherein the processors are further operable when executing the instructions to construct a graph representing the input variables and the test values from the test cases that are for the input variables, wherein the graph comprises:

one or more levels corresponding to the input variables, wherein each one of the levels is associated with one of the input variables;

one or more nodes at each one of the levels; and one or more edges, wherein each one of the edges links two of the nodes from two of the adjacent levels and represents one of the test values for the input variable associated with the higher one of the two adjacent levels.

18. The system of claim 15, wherein the processors are further operable when executing the instructions to construct a bipartite graph representing the test cases and the conditional branching points, wherein the bipartite graph comprises:

a plurality of first nodes corresponding to the test cases, wherein each one of the first nodes represents one of the test case;

one or more second nodes corresponding to the conditional branching points, wherein each one of the second nodes represents one of the conditional branching points;

a plurality of edges, wherein each one of the edges links one of the first nodes and one of the second nodes, wherein the test case represented by the one of the first nodes covers the conditional branching point represented by the one of the second nodes.

19. One or more computer-readable non-transitory storage media embodying software operable when executed by one or more computing devices to:

access a software module, wherein:

the software module comprises:

one or more input variables;

one or more intermediate variables, wherein a value of each one of the intermediate variables directly or indirectly depends on at least one value of at least one of the input variables; and one or more conditional branching points, wherein each one of the conditional branching points has a branching condition specified by at least one of the input or intermediate variables, and whether the branching condition is satisfied depend on at least one value of the at least one of the input or intermediate variables; and during execution of the software module, at each one of the conditional branching points, the software module proceeds down different paths depending on whether the branching condition of the conditional branching point is satisfied;

construct one or more sets of variables corresponding to the input variables, wherein each one of the sets of variables comprises one of the input variables and the intermediate variables whose values directly or indirectly depend on the value of the one of the input variables;

for each one of the sets of variables, compute an average branching depth that is affected by the input and intermediate variables of the set of variables;

select a first one of the sets of variables that has the smallest average branching depth;

assign a first symbolic value to the input variable of the first one of the sets of variables;

symbolically execute the software module, with the input variable of the first one of the sets of variables having the first symbolic value, to generate a first set of test cases for the input and intermediate variables of the first set of variables; and validate the software module using the first set of test cases.

20. The media of claim 19, wherein the software is further operable when executed by the computing devices to for each one of the input variables, determine which ones of the intermediate variables whose values directly or indirectly depend on the value of the input variable using relevancy analysis.

21. The media of claim 19, wherein:

the software module comprises one or more branching levels;

each one of the branching levels comprises at least one of the conditional branching points; and for each one of the sets of variables, compute the average branching depth that is caused by the input and intermediate variables of the set of variables comprises:

for the input variable of the set of variables, compute a number of branching levels that have conditional branching points whose branching conditions depend on the input variable;

for each one of the intermediate variables of the set of variables, compute a number of branching levels that have conditional branching points whose branching conditions depend on the intermediate variable; and compute an average of the numbers of branching levels as the average branching depth for the set of variables.

22. The media of claim 19, wherein when selecting the first one of the sets of variables that has the smallest average branching depth, if there are multiple ones of the sets of variables that have the smallest average branching depth, then randomly select one of the sets of variables that have the smallest average branching depth as the first set of variables.

23. The media of claim 19, wherein the software is further operable when executed by the computing devices to:

select a second one of the sets of variables that has the next smallest average branching depth;

assign a second symbolic value to the input variable of the second one of the sets of variables;

symbolically execute the software module, with the input variable of the second one of the sets of variables having the second symbolic value, to generate a second set of test cases for the input and intermediate variables of the second set of variables; and validate the software module using the second set of test cases.

24. One or more computer-readable non-transitory storage media embodying software operable when executed by one or more computing devices to:
  access a software module and a plurality of test cases for the software module, wherein:
    the software module comprises:
      one or more variables; and
      one or more conditional branching points, wherein each one of the conditional branching points has a branching condition specified by at least one of the variables, and whether the branching condition is satisfied depend on at least one value of the at least one of the variables; and
    during execution of the software module, at each one of the conditional branching points, the software module proceeds down different paths depending on whether the branching condition of the conditional branching point is satisfied;
    each one of the test cases covers at least one of the conditional branching points and comprises at least one test value for the at least one of the variables that specify the branching conditions of the at least one of the conditional branching points;
  for each one of the conditional branching points, if there are multiple ones of the test cases covering the conditional branching points that cause the software module to proceed down the same path during execution, then remove from the test cases all except one of the multiple ones of the test cases covering the conditional branching points that cause the software module to proceeding down the same path;
  select from the remaining test cases one or more first test cases, wherein for each one of the first test cases, at least one of the conditional branching points is covered only by the first test case;
  iteratively select from the remaining test cases one or more second test cases, wherein the second test case selected during each iteration covers the most number of the conditional branching points during that iteration, until all of the conditional branching points are covered by at least one of the first or second test cases; and
  test the software module using only the selected first and second test cases.

25. The media of claim 24, wherein the variables of the software module comprise one or more input variables and one or more intermediate variables, wherein a value of each one of the intermediate variables directly or indirectly depends on at least one value of at least one of the input variables.

26. The media of claim 25, wherein the software is further operable when executed by the computing devices to construct a graph representing the input variables and the test values from the test cases that are for the input variables, wherein the graph comprises:
  one or more levels corresponding to the input variables, wherein each one of the levels is associated with one of the input variables;
  one or more nodes at each one of the levels; and
  one or more edges, wherein each one of the edges links two of the nodes from two of the adjacent levels and represents one of the test values for the input variable associated with the higher one of the two adjacent levels.

27. The media of claim 24, wherein the software is further operable when executed by the computing devices to construct a bipartite graph representing the test cases and the conditional branching points, wherein the bipartite graph comprises:
  a plurality of first nodes corresponding to the test cases, wherein each one of the first nodes represents one of the test case;
  one or more second nodes corresponding to the conditional branching points, wherein each one of the second nodes represents one of the conditional branching points;
  a plurality of edges, wherein each one of the edges links one of the first nodes and one of the second nodes, wherein the test case represented by the one of the first nodes covers the conditional branching point represented by the one of the second nodes.

28. A system stored in a memory comprising:
  means for accessing a software module, wherein:
    the software module comprises:
      one or more input variables;
      one or more intermediate variables, wherein a value of each one of the intermediate variables directly or indirectly depends on at least one value of at least one of the input variables; and
      one or more conditional branching points, wherein each one of the conditional branching points has a branching condition specified by at least one of the input or intermediate variables, and whether the branching condition is satisfied depend on at least one value of the at least one of the input or intermediate variables; and
    during execution of the software module, at each one of the conditional branching points, the software module proceeds down different paths depending on whether the branching condition of the conditional branching point is satisfied;
  means for constructing one or more sets of variables corresponding to the input variables, wherein each one of the sets of variables comprises one of the input variables and the intermediate variables whose values directly or indirectly depend on the value of the one of the input variables;
  for each one of the sets of variables, means for computing an average branching depth that is affected by the input and intermediate variables of the set of variables;
  means for selecting a first one of the sets of variables that has the smallest average branching depth;
  means for assigning a first symbolic value to the input variable of the first one of the sets of variables;
  means for symbolically executing the software module, with the input variable of the first one of the sets of variables having the first symbolic value, to generate a first set of test cases for the input and intermediate variables of the first set of variables; and
  means for validating the software module using the first set of test cases.

29. A system stored in a memory comprising:
  accessing a software module and a plurality of test cases for the software module, wherein:
    the software module comprises:
      one or more variables; and
      one or more conditional branching points, wherein each one of the conditional branching points has a branching condition specified by at least one of the variables, and whether the branching condition is satisfied depend on at least one value of the at least one of the variables; and
    during execution of the software module, at each one of the conditional branching points, the software module proceeds down different paths depending on whether the branching condition of the conditional branching point is satisfied;

each one of the test cases covers at least one of the conditional branching points and comprises at least one test value for the at least one of the variables that specify the branching conditions of the at least one of the conditional branching points;

for each one of the conditional branching points, if there are multiple ones of the test cases covering the conditional branching points that cause the software module to proceed down the same path during execution, then means for removing from the test cases all except one of the multiple ones of the test cases covering the conditional branching points that cause the software module to proceeding down the same path;

means for selecting from the remaining test cases one or more first test cases, wherein for each one of the first test cases, at least one of the conditional branching points is covered only by the first test case;

means for iteratively selecting from the remaining test cases one or more second test cases, wherein the second test case selected during each iteration covers the most number of the conditional branching points during that iteration, until all of the conditional branching points are covered by at least one of the first or second test cases; and means for testing the software module using only the selected first and second test cases.

* * * * *